United States Patent
Yokoyama et al.

(10) Patent No.: US 8,246,252 B2
(45) Date of Patent: Aug. 21, 2012

(54) BEARING APPARATUS (75) Inventors: Keisuke Yokoyama, Fujisawa (JP); Kunihiko Sasao, Fujisawa (JP)

(73) Assignee: NSK Ltd., Tokyo (JP)

( * ) Notice: Subject to any disclaimer, the term of this patent is extended or adjusted under 35 U.S.C. 154(b) by 746 days.

(21) Appl. No.: 12/439,207

(22) PCT Filed: Mar. 15, 2007

(86) PCT No.: PCT/JP2007/055212
§ 371 (c)(1),
(2), (4) Date: Feb. 27, 2009

(87) PCT Pub. No.: WO2008/029528
PCT Pub. Date: Mar. 13, 2008

(65) Prior Publication Data
US 2010/0002974 A1    Jan. 7, 2010

(30) Foreign Application Priority Data

Sep. 6, 2006   (JP) ................................. 2006-241496
Dec. 19, 2006  (JP) ................................. 2006-340754

(51) Int. Cl.
*F16C 32/00*  (2006.01)
*G01K 7/00*   (2006.01)
*H01C 7/13*   (2006.01)
(52) U.S. Cl. ....................... 384/448; 374/185; 338/22 R
(58) Field of Classification Search .................. 384/448; 374/185; 338/22 R
See application file for complete search history.

(56) References Cited

U.S. PATENT DOCUMENTS

| 5,026,178 | A | * | 6/1991 | Ballhaus ........................ 384/448 |
| 5,585,577 | A | * | 12/1996 | Lemoine et al. ............. 73/866.5 |
| 5,952,587 | A | * | 9/1999 | Rhodes et al. ............ 73/862.541 |
| 6,484,582 | B2 | * | 11/2002 | Ehrfeld et al. .................. 73/593 |
| 6,971,799 | B2 | * | 12/2005 | Sato et al. ...................... 384/448 |
| 7,018,105 | B2 | * | 3/2006 | Oka ................................ 384/448 |
| 2002/0054719 | A1 | * | 5/2002 | Takizawa et al. ............. 384/448 |
| 2006/0170551 | A1 | * | 8/2006 | Nakamura et al. .......... 340/572.1 |

FOREIGN PATENT DOCUMENTS

| JP | 11-118622 A | 4/1999 |
| JP | 2002-130263 A | 5/2002 |
| JP | 2002-206528 A | 7/2002 |
| JP | 2002-351254 A | 12/2002 |
| JP | 2003-113835 A | 4/2003 |
| JP | 2003-209341 A | 7/2003 |
| JP | 2005-043336 A | 2/2005 |

* cited by examiner

*Primary Examiner* — Thomas R Hannon
(74) *Attorney, Agent, or Firm* — Miles & Stockbridge P.C.

(57) ABSTRACT

A bearing apparatus has a rolling bearing including an outer ring (11), an inner ring (12), and rolling elements (13) disposed between the two rings, and a temperature sensor (TS) for measuring an internal temperature of the rolling bearing. A wire from the temperature sensor extends to the outside via a through-hole (11d) formed in a component of the bearing apparatus, and hence the temperature sensor can be disposed in a desired position with excellent wiring extension flexibility, thereby enabling a temperature in the desired position of the bearing to be measured. The temperature sensor, which can be configured thin in a small size with flexibility, can therefore be incorporated into whichever portion of the bearing, wherein a high response to temperature detection is attained, and detectability of abnormality in temperature can be improved.

9 Claims, 9 Drawing Sheets

BEARING APPARATUS

TECHNICAL FIELD

The present invention relates generally to a bearing apparatus including a temperature sensor and a manufacturing method thereof, and more particularly to a bearing apparatus and a manufacturing method thereof, which are suitable for use of electric parts of an automobile, an alternator as an engine auxiliary, an intermediary pulley, an electromagnetic clutch for a car air-conditioner, a water pump, a hub unit, an electromagnetic clutch for a gas heat pump, a compressor, a linear guide apparatus, a ball screw, and the like.

BACKGROUND ART

A bearing apparatus for supporting rotary parts has hitherto been, when once incorporated, subjected to none of periodic inspections in many cases, and in such a case it often happened that an interior thereof was inspected for the first time just when inconvenience occurred due to abnormality in temperature. Further, in the case of the bearings for a railway vehicle, a wind turbine, or the like, the bearing apparatus and other portions are decomposed and inspected after being used for a predetermined period of time. It is therefore difficult to predict the inconvenience due to the abnormality in temperature beforehand. By contrast, there is an attempt for detecting the abnormality in the bearing before critical inconvenience occurs by measuring a change in temperature in a way that fits the temperature sensor to a bearing apparatus (refer to Patent document 1 given below).

[Patent document 1] Japanese Patent Laid-Open Publication No. 2002-130263

DISCLOSURE OF THE INVENTION

According to the technology disclosed in the Patent document 1, the temperature sensor involves using a stack type thermistor, and the wire therefrom is drawn out to the outside via a groove provided in an inner ring. In the case of drawing out the wire via the groove formed in the inner ring, the wire needs extending along the surface of the inner ring, and such a problem arises that the wire increases in its length. Further, the temperature sensor, if of a thin type, can be disposed in an inner part of the bearing, however, a problem is how the wire is drawn therefrom.

Moreover, as described above, the conventional method is hard to detect the abnormality till the inconvenience occurs due to the abnormality in temperature. Further, as in the Patent document 1, if the stack type thermistor is used for the temperature sensor, the thermistor is hard to be worked in a complicated configuration, the fitting position is limited, there is also a possibility in which the thermistor body is composed of ceramic and therefore might be cracked due to a strong impact, and further it is difficult to apply to the general type of bearing because of an increase in the number of manufacturing processes and entailing a considerable cost.

It is an object of the present invention, which was devised in view of the problems inherent in the prior arts described above, to provide a bearing apparatus capable of measuring a temperature in a desired position by a temperature sensor and being excellent in terms of wiring extension flexibility.

It is another object of the present invention to provide a bearing apparatus and a manufacturing method thereof, which are capable of having durability without any limitation in a fitting position of the temperature sensor and improving detectability of temperature abnormality.

A first bearing apparatus according to the present invention is a bearing apparatus comprising: a rolling bearing including an outer ring, an inner ring, and rolling elements disposed between the two rings; and a temperature sensor for measuring an internal temperature of the rolling bearing, wherein a wire from the temperature sensor extends to the outside via a through-hole formed in a component of the bearing apparatus.

According to the first bearing apparatus, the wire from the temperature sensor extends to the outside via the through-hole formed in the component of the bearing apparatus, and hence, even when the temperature sensor is disposed in an internal position optimal to measuring the temperature with high accuracy, the wire can be drawn out to an optional place via the through-hole from the temperature sensor by forming the through-hole in any one of the components.

A second bearing apparatus according to the present invention comprises: a bearing; and a temperature sensor, the temperature sensor including: a film-like substrate composed of a heat-resistant resin; a film-like temperature sensor portion formed on the substrate; a film-like cover provided so as to cover the temperature sensor portion and composed of the heat-resistant resin; and a wire fitting portion configured so that a part of the temperature sensor portion is exposed to the surface of the cover, wherein the temperature sensor is fitted so as to contact with a bearing portion.

A third bearing apparatus according to the present invention comprises: a rolling bearing including an outer ring, an inner ring, and rolling elements disposed between the outer and inner rings; and temperature sensor, the temperature sensor including: a film-like substrate composed of a heat-resistant resin; a film-like temperature sensor portion formed on the substrate; a film-like cover provided so as to cover the temperature sensor portion and composed of the heat-resistant resin; and a wire fitting portion configured so that a part of the temperature sensor portion is exposed to the surface of the cover, wherein the substrate or the cover is fitted so as to contact with the bearing portion.

According to the second and third bearing apparatuses, the temperature sensor is constructed of the film-like temperature sensor portion formed on the film-like substrate, and the wire fitting portion exposed to the surface of the film-like cover, and can be configured in a small size as well as being thinner and having more flexibility than the conventional chip type stack thermistor, and hence there is no limitation in terms of the fitting position of the temperature sensor. Accordingly, it is feasible to realize the bearing apparatus including the temperature sensor that can be incorporated into whichever portion of the bearing, therefore gains a high response of the temperature detection, and enables the detectability of the abnormality in temperature to be improved. Moreover, there is lessened a possibility of deteriorating the temperature sensor because the film-like temperature sensor portion is covered with the film cover, and there is no possibility of the temperature sensor being cracked because the whole temperature sensor takes the flexible structure. Hence, the bearing with the temperature sensor having durability can be actualized.

In the third bearing apparatus, it is preferable that the temperature sensor is fitted to a recessed portion formed in rolling surface of a ring on a fixing side. Further, it is preferable that the temperature sensor is fitted in the vicinity of the rolling surface of the ring on the fixing side. Moreover, the rolling bearing may include a seal attached to the ring on the fixing side, and the temperature sensor may be fitted to the seal. In this case, the seal may include a cored bar and an elastic portion, and the temperature sensor may be fitted to the cored bar or the elastic portion.

It is also preferable that a wiring draw-out portion for drawing out to the outside via an electric wire electrically connected to the wire fitting portion is provided on the ring on the fixing side. The wiring draw-out portion may be, e.g., a through-hole formed in the side face from the inner surface of the ring on the fixing side, a through-hole formed in the ring on the fixing side, a groove formed in the outer surface of the ring on the fixing side, a groove formed in the inner surface of the ring on the fixing side, a through-hole formed in the seal, a groove formed in the seal, or the like.

In the second and third bearing apparatuses, the substrate and the cover are each composed of a polyimide resin, thereby enabling heat resistance to be sufficiently obtained.

A bearing apparatus manufacturing method of manufacturing a bearing apparatus including a bearing and a temperature sensor according to the present invention, comprises: forming a multiplicity of film-like temperature sensor portions on a film composed of a heat-resistant resin in a semiconductor manufacturing process; covering the film with another film composed of the heat-resistant resin; forming a wire fitting portion configured so that a part of the temperature sensor portion is exposed to the surface of the cover by removing a portion corresponding to the part of the temperature sensor portion on the another film in the semiconductor manufacturing process; cutting the film and the another film for the every temperature sensor portion to obtain the temperature sensor, and, thereafter, fitting the temperature sensor to a bearing portion.

According to the bearing apparatus manufacturing method, after respectively forming the multiplicity of temperature sensor portions on the film and the wire fitting portions exposed to another film covering the former film in the semiconductor manufacturing process, the multiplicity of temperature sensors can be acquired by cutting the film and another film according to every temperature sensor portion, whereby the temperature sensors, which are thinner, larger of flexibility and smaller than a conventional chip type stack thermistor, can be easily mass-produced. It is therefore feasible to reduce a manufacturing cost for the bearing apparatus including the temperature sensor and to provide the bearing apparatus including the temperature sensor at a low cost.

In the bearing apparatus manufacturing method described above, it is preferable that the electric wire is fitted to the wire fitting portion after forming the wire fitting portion, and thereafter the cutting process is executed. Further, it is preferable that another film has an adhesive property.

BEST MODE FOR CARRYING OUT THE INVENTION

Next, embodiments of the present invention will hereinafter be described with reference to the drawings.

First Embodiment

Figure 1:
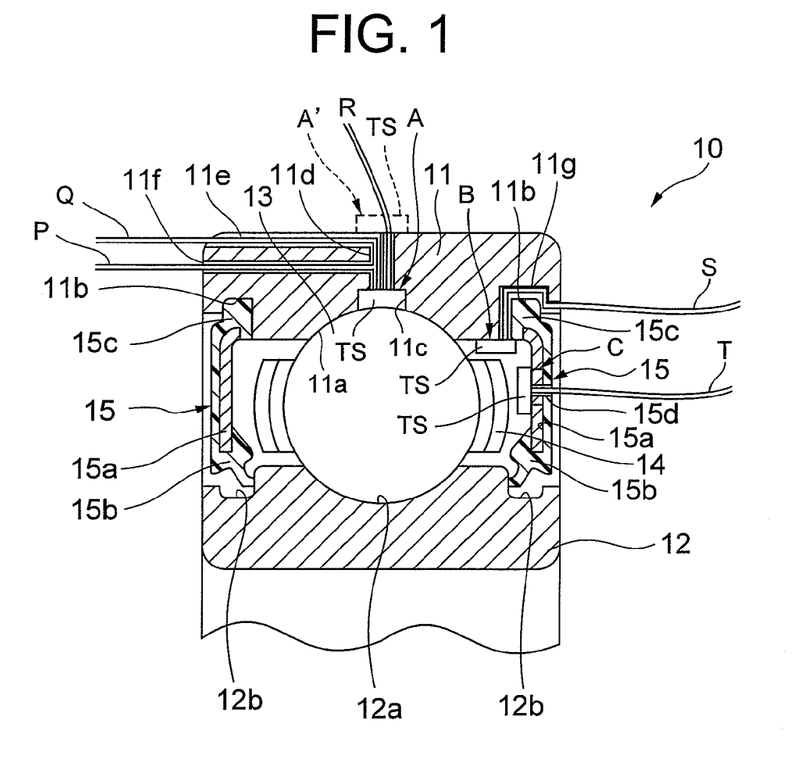
FIG. 1 A sectional view taken in a direction of an axis line, showing a bearing apparatus according to a first embodiment.

FIG. 1 is a sectional view of a bearing apparatus as viewed in a direction along an axis line, which is used in a first embodiment. A bearing apparatus (which is also termed a rolling bearing) 10 includes an outer ring 11, an inner ring 12, balls 13 serving as rolling elements interposed between the two rings 11 and 12, a retainer 14 for holding the balls 13 at equal intervals in a peripheral direction, and disc-shaped seals 15, 15 for sealing the spaces between the two rings 11 and 12. The balls 13 may be composed of ceramics such as silicon nitride and silicon carbide.

The outer ring 11 has, along its inner periphery, a raceway surface 11a, and fitting grooves 11b, 11b formed in the vicinity of both ends. The inner ring 12 has, along its outer periphery, a raceway surface 12a, and sealing grooves 12b, 12b formed in the vicinity of both ends.

The seal 15 includes a cored bar 15a having a main portion, other than a hook portion, composed of a substantially doughnut-shaped metal plate (SPCC, SECC or the like) and the hook portion, a lip portion 15b composed of a synthetic rubber (such as a nitrile rubber, an acrylic rubber, a silicone rubber or a fluororubber) that is integrally formed by galvanization on an inner-diametrical side of the cored bar 15a, and a synthetic rubber fitting portion 15c that is integrally formed by galvanization on an outer-diametrical side of the cored bar 15a. The seal 15 is attached to the outer ring 11 by engaging with the fitting grooves 11b from outside while getting the fitting portion 15c elastically deformed. In such a state, a front end of the lip portion 15b contacts with the sealing groove 12b. Note that the seal of the bearing apparatus 10 is not limited to the contact rubber seal but may involve employing a non-contact rubber seal and a non-contact steel plate. A temperature sensor TS is provided in a non-contact state with the balls 13 at the center of the raceway surface 11a of the outer ring 11. Referring to FIG. 1, the temperature sensor TS is depicted in exaggeration in terms of its thickness.

A method of manufacturing the temperature sensor TS will be discussed. To begin with, a high-temperature resistant insulating thin film M of DLC (Diamond-Like Carbon) having a thickness of 1 μm is formed on the surface (which is herein a shallow peripheral groove or cavity 11c formed in the raceway surface 11a of the outer ring 11) of a member on which the temperature sensor TS is desired to be disposed. A micro sensor pattern P is formed of a silver film thereon by an ink jet method. Thereafter, the sensor pattern P is baked, thereby enabling the temperature sensor TS to be disposed on the outer ring 11 without using any bonding agent. The wiring of the temperature sensor may similarly undergo patterning, depending on an actually-disposed portion.

The sensor pattern P is formed by discharging a fluid dispersion containing, e.g., silver ultra-fine particles dispersing in an independent state as an ink from a micro nozzle onto the high-temperature resistant insulating thin film M. The discharged ink is evaporated by its being baked or left to stand in a low-vacuum gas, thereby enabling a strong silver film to be acquired. The conductive thin film can be formed by employing the particles of gold, copper, aluminum, or the like without being limited to silver. Note that the formation of the thin film based on the ink jet method is disclosed in detail in, e.g., Japanese Patent Laid-Open Publication No. 2003-209341, and hence its explanation is omitted hereinafter. Further, the sensor pattern P may also be formed by a method other than the ink jet method.

Figure 2:
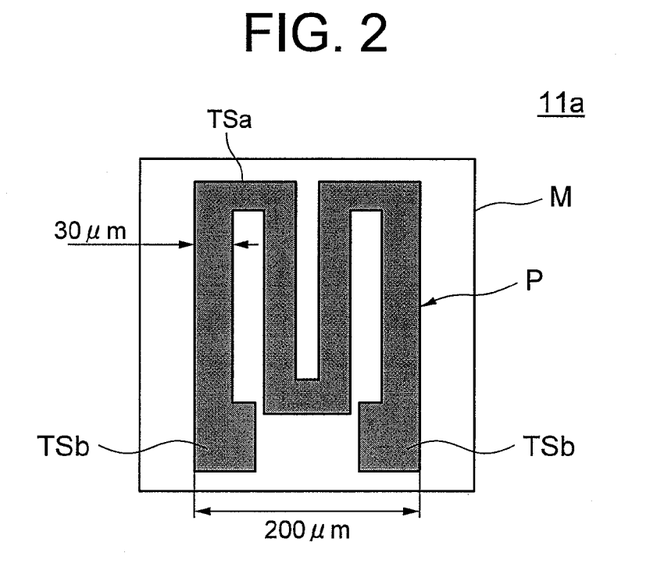
FIG. 2 An enlarged view showing a sensor pattern P of a temperature sensor TS in FIG. 1.

FIG. 2 is an enlarged view showing the sensor pattern P of the temperature sensor TS in FIG. 1. The wirings connected to the outside are connected to terminals TSb, TSb provided at both ends of a zigzag pattern line TSa. The pattern P is a micro pattern that is 200 μm in entire width and approximately 30 μm in line width. When the portion formed with the sensor pattern P gets deformed due to thermal expansion, a length of the pattern line TSa changes with the result that a resistance value thereof varies. It is therefore possible to measure the temperature with the high accuracy by detecting a change in electric current flowing from outside.

In FIG. 1, when the temperature sensor TS is disposed in a position A within the raceway surface 11a of the outer ring 11, a hole 11d penetrating the outer ring 11 in the radial direction is formed, and the wiring R connected to the temperature sensor TS can be drawn out to the outside in the radial direction via the hole 11d. Note that if the outer ring 11 is, for example, disposed within an unillustrated cylindrical portion, the wiring R can not be drawn out in the radial direction of the bearing 10 as the case may be. In such a case, a groove 11e extending in the direction of the axis line is formed along the outer periphery of the outer ring 11, and the wiring Q connected to the temperature sensor TS can be also drawn out to the outside in the direction of the axis line via the hole 11d and the groove 11e. Alternatively, a groove 11f extending in direction of the axis line, which intersects the hole 11d inside, is formed by boring the side face of the outer ring 11, and the wiring P connected to the temperature sensor TS can be also drawn out to the outside in the direction of the axis line via the hole 11d and the groove 11f from the side face of the outer ring 11.

According to the first embodiment, the wiring from the temperature sensor TS extends to the outside via the through-hole 11d or the like formed in the outer ring 11, and hence it is feasible to make the highly-accurate measurement by disposing the temperature sensor TS in the internal position optimal to measure the temperature, and further to draw out the wiring to an optional position such as the side face of the bearing via the hole 11d or the like from the temperature sensor TS by forming the hole 11d or the like in the outer ring 11.

As a modification of the first embodiment, the temperature sensor TS can be disposed in a position B on the inner peripheral surface other than the raceway surface 11a of the outer ring 11. In such a case, a groove 11g extending in the direction of the axis line is further formed in the bottom of the fitting groove 11b, and the wiring S connected to the temperature sensor TS can be also drawn out to the outside in the direction of the axis line via the groove 11g. Further, another modification of the first embodiment is that the temperature sensor TS can be disposed in a position C on the inside surface of the cored bar 15a of the seal 15. In such a case, a hole 15d penetrating in the direction of the axis line the seal 15 is formed, and the wiring T connected to the temperature sensor TS can be drawn out to the outside in the direction of the axis line via the hole 15d.

First Example

Next, the present invention will be described in greater detail by way of a first example, however, the present invention is not limited to the example.

Figure 3:
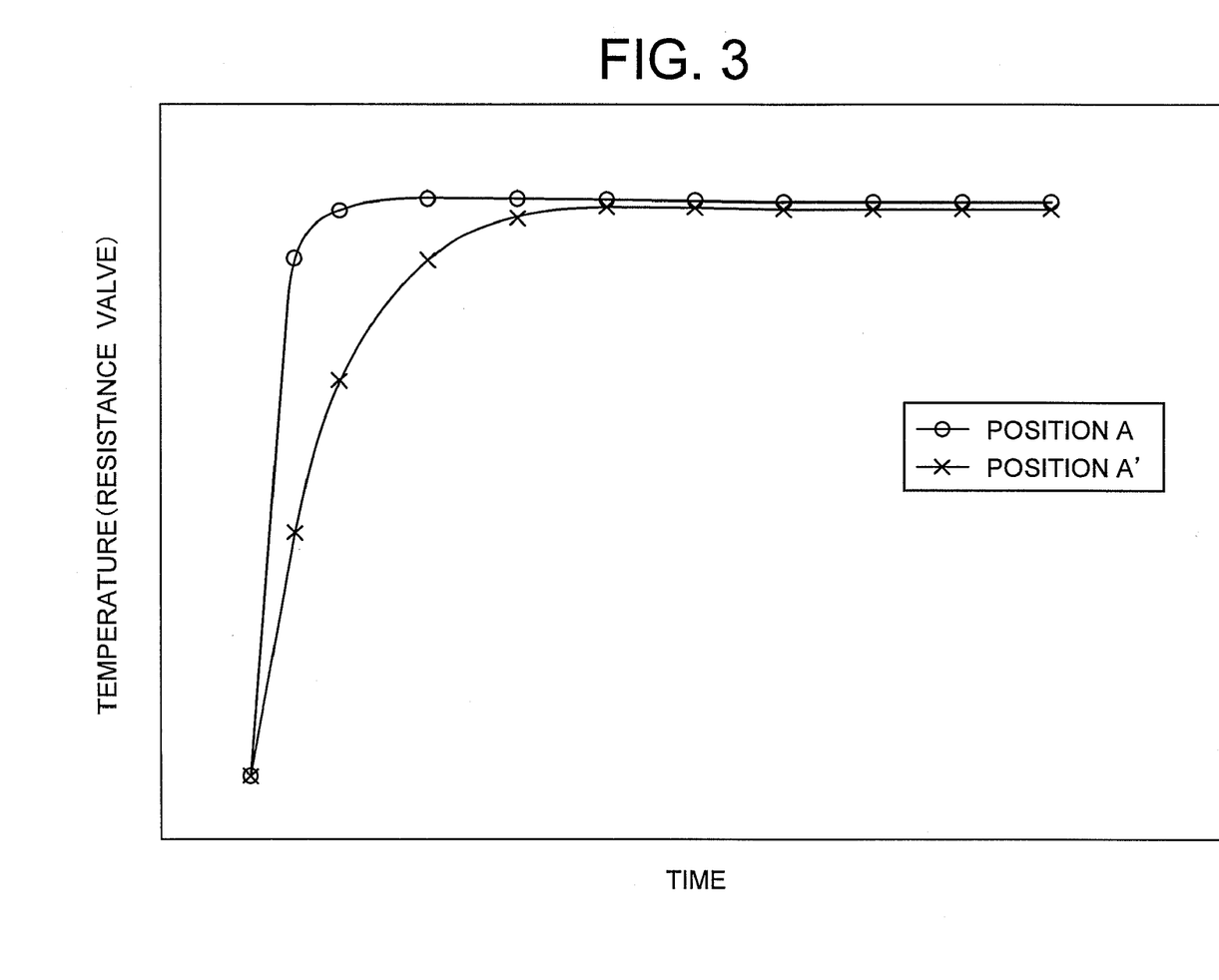
FIG. 3 A diagram showing a result of simulating a rise in temperature when operating the bearing apparatus in a first example.

The present inventors, by way of the first example as shown in FIG. 1, attach the temperature sensor TS manufactured by the method described above to the raceway surface 11a (position A) of the outer ring 11 and further, by way of a first comparative example, attach the temperature sensor TS to an external peripheral surface (position A') of the outer ring 11 as depicted by a broken line in FIG. 1, and simulate a rise in temperature when operating the bearing apparatus. A result thereof is shown in FIG. 3. Note that the specifications used for the simulation are given as below.

Bearing: single row deep groove ball bearing 6203 (bearing number) made by NSK Ltd.
Number of revolutions: 10,000 min$^{-1}$
Rotating time: one hour As apparent from FIG. 3, in comparison with a case where the temperature sensor TS is disposed outside the bearing apparatus 10 as in the first comparative example, when the temperature sensor TS is disposed within the bearing apparatus 10 as in first example, it is understood that a change in temperature of the bearing apparatus can be measured with a high response. The temperature sensor TS in the present embodiment has the conductive thin film P, which undergoes patterning by the ink jet method, is provided on the insulating thin film M formed on the surface of the outer ring 11 defined as the component of the bearing 10, and can therefore measure the temperature of the bearing with the high accuracy and the high response through the conductive thin film P. Accordingly, the measurement of the temperature with the high response enables the highly-accurate prediction of the inconvenience occurring on the bearing apparatus, accompanied with an abnormal rise in temperature as a symptom. It should be noted that a variety of sensors such as a stack type thermistor may also be used without being limited to the temperature sensor described above.

Second Embodiment

Figure 4:
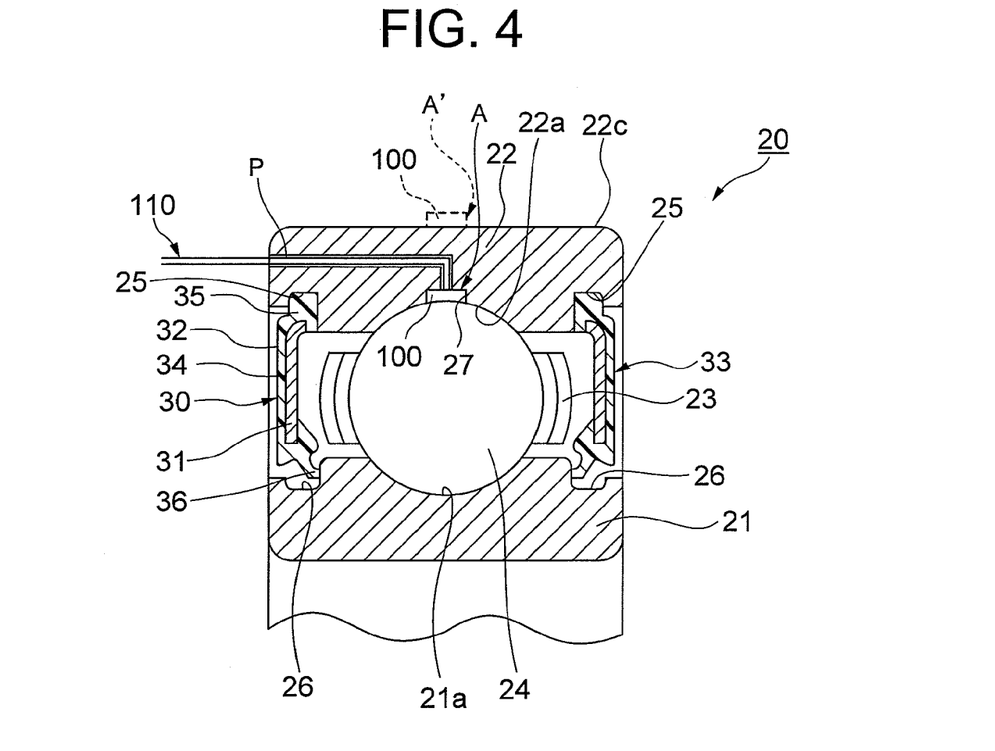
FIG. 4 A principal sectional view showing the bearing with the temperature sensor in a second embodiment.

FIG. 4 is a principal sectional view showing a principal portion of a bearing with a temperature sensor in a second embodiment. As illustrated in FIG. 4, a bearing apparatus (which is termed the bearing with the temperature sensor and also simply termed the bearing) 20 includes an inner ring 21 having a rolling surface 21a on its outer peripheral surface, an outer ring 22 having a rolling surface 22a on its inner peripheral surface, a plurality of balls 24 serving as rolling elements interposed between the outer ring 22 and the inner ring 21, a retainer 23 for holding the plurality of balls 24 in equally-spaced positions, and a temperature sensor 100 for detecting a temperature of the bearing.

The bearing 20 is a rolling bearing attached with seals in the case of rotations of the inner ring and includes seals 30, 33 on both sides. The seal 30 is constructed of a ring-shaped cored bar 31 having a hook portion on its outer periphery and of an elastic member 32 formed by galvanizing integrally the synthetic rubber on the outside thereof, and is separated, in terms of functions thereof, into an annular main portion 34 consisting of a portion, other than the hook portion, of the cored bar 31 and the elastic member 32 provided outside, a clamping portion 35 constructed of the hook portion of the cored bar 31 and the elastic member provided outside and stopped by a stop groove 25 formed in an inner peripheral surface of the outer ring 22, and a lip portion 36 constructed of the elastic member on the inner peripheral side of the cored bar 31 and contacting with a receiving groove 26 formed in an outer peripheral surface of the inner ring 21.

The seal 30 is disposed between the outer ring 22 and the inner ring 21 of the bearing 20 in a way that gets intruded into the stop groove 25 formed in the inner peripheral surface of the outer ring 22 while getting the clamping portion 35 to be elastically deformed in a state where the lip portion 36 contacts with the receiving groove 26 formed in the outer peripheral surface of the inner ring 21. The seal 33 has the same structure as the seal 30 has and is similarly disposed between the outer ring 22 and the inner ring 21. General materials of this type of seals 30, 33 involve using, for the cored bar, the steel plate such as SPCC and SECC, and using, for the elastic member forming the lip and the like, the synthetic rubber such as a nitrile rubber, an acrylic rubber, a silicone rubber, or a fluororubber. Note that the seals 30, 33 may also be non-contact rubber seals and non-contact steel plates without being limited to the contact rubber seals as shown in FIG. 4.

The outer ring 22 on the fixing side is provided with a recessed portion 27 for the temperature sensor 100, which is formed in the rolling surface 22a, and a through-hole P penetrating the recessed portion 27 in the inner peripheral surface of the outer ring 22 and the side face of the outer ring 22 throughout, is provided as a wiring draw-out portion.

The temperature sensor 100 is fitted to the recessed portion 27 provided in the rolling surface 22a of the outer ring 22 on the fixing side, and a pair of electric wires 110 extending from the temperature sensor 100 is drawn out to the outside from the side face of the outer ring 22 via the through-hole P. Note that the temperature sensor 100 can be fitted to the recessed portion 27 through a fitting process and with a heat-resistant bonding agent.

Figure 5A:
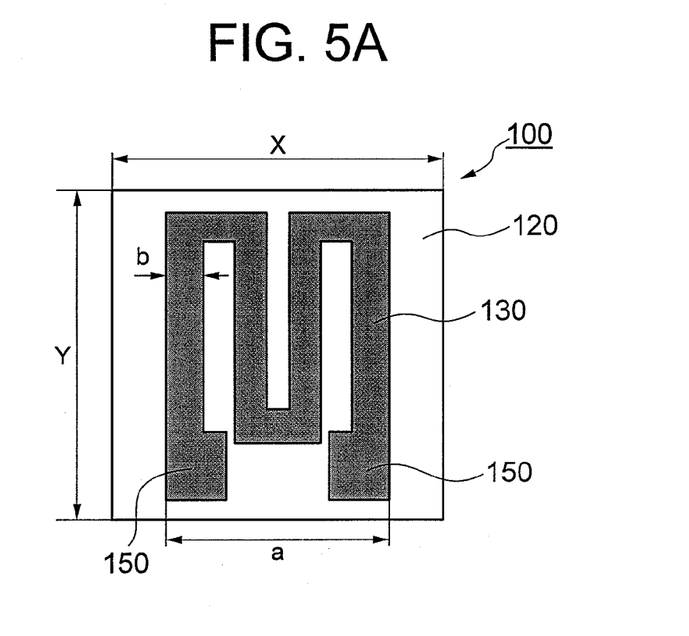
FIG. 5A A plan view showing a temperature sensor portion formed on a film substrate of the temperature sensor in FIG. 4.
Figure 5B:
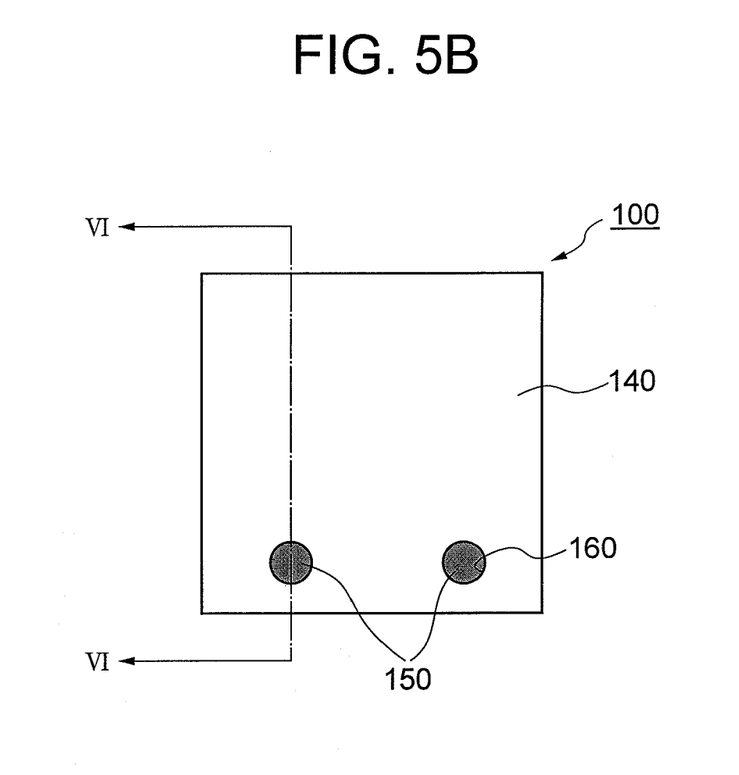
FIG. 5B A plan view showing a film cover provided on the film substrate in FIG. 4.
Figure 6:
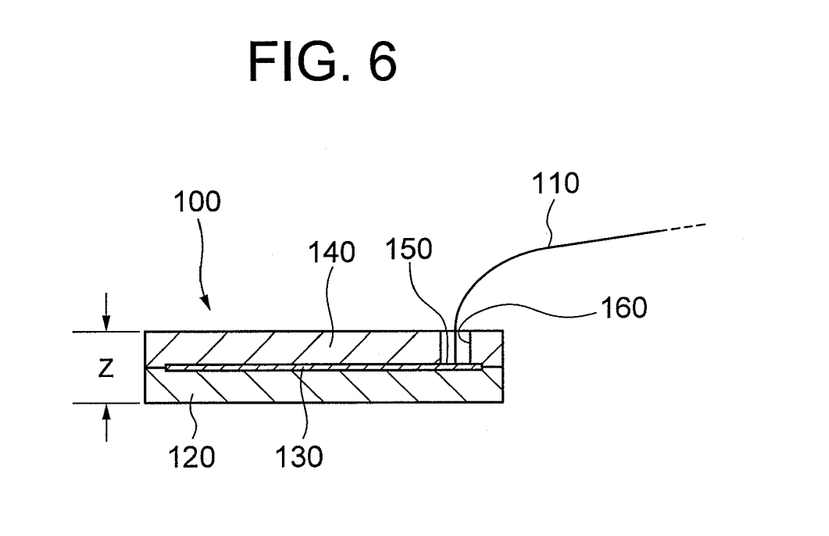
FIG. 6 A view of the temperature sensor in which electric wires are electrically connected to the wire fitting portion in FIG. 5B, as viewed in section taken along the line VI-VI in FIG. 5B.

The temperature sensor 100 mentioned above will hereinafter be described with reference to FIGS. 5A, 5B and 6. FIG. 5A is a plan view showing the temperature sensor portion formed on a film substrate of the temperature sensor, and FIG. 5B is a plan view illustrating a film cover provided on the film substrate. FIG. 6 is a view of the temperature sensor in which the electric wires are electrically connected to the wire fitting portion in FIG. 5B, as viewed in section taken along the line VI-VI in FIG. 5B.

As in FIGS. 5A, 5B and 6, the temperature sensor 100 includes a film substrate 120 composed of a polyimide resin (PI) having a heat-resistant property and flexibility, a film-like temperature sensor portion 130 composed of platinum or the like that is formed on the film substrate 120, and a film cover 140 composed of the same type of polyimide resin, which is disposed so as to cover the film substrate 120 formed with the temperature sensor portion 130, and takes a small-sized configuration taking a small rectangular shape on the whole, being small in thickness and having the flexibility.

The film-like temperature sensor portion 130 is, as in FIG. 5A, constructed of a band-shaped portion having an entire width a and a band width b, and the band-shaped portion having the band width b is bent at a plurality of points in order to ensure a large length of the band on the whole. A pair of wire fitting portions 150, 150 are provided wider than the band width b at both edges of the band-shaped portion having the band width b, which are positioned at the right-and-left edges of the lower part of the film-like temperature sensor portion 130 as viewed in FIG. 5A.

The film cover 140 covering the film substrate 120 is, as shown in FIG. 6, formed with holes 160 in positions corresponding to the pair of wire fitting portions 150, 150 in FIG. 5A, whereby the pair of wire fitting portions 150, 150 are exposed to the surface of the film cover 140 as in FIG. 5B. A pair of electric wires 110 are electrically connected to the pair of wire fitting portions 150, 150.

Note that the pair of electric wires 110 are connected to a temperature measuring device, and the temperature is measured based on a resistance value of the temperature sensor portion 130, which varies depending on a change of the temperature.

As discussed above, the temperature sensor 100 is constructed of the film-like temperature sensor portion 130 formed on the film substrate 120, and the wire fitting portions 150 exposed to the surface of the film cover 140, and is therefore thinner, larger of the flexibility and smaller than the conventional chip type stack thermistor, with the result that there is no limitation in terms of the fitting position of the temperature sensor 100. Accordingly, the temperature sensor 100 can be incorporated into whichever portion of the bearing, and is, in the bearing 20 with the temperature sensor in FIG. 4, incorporated into the recessed portion 27 formed in the rolling surface 22a of the outer ring 22 of the interior of the bearing, thereby enabling the response of the temperature detection to become preferable and the detectability of the abnormality in temperature to be improved.

Further, there is lessened a possibility of deteriorating the temperature sensor 100 because of the film-like temperature sensor portion 130 being covered with the film cover 140, and there is no possibility of the temperature sensor 100 being cracked because of the whole temperature sensor 100 taking the flexible structure. Hence, the bearing with temperature sensor having durability can be actualized.

Figure 7:
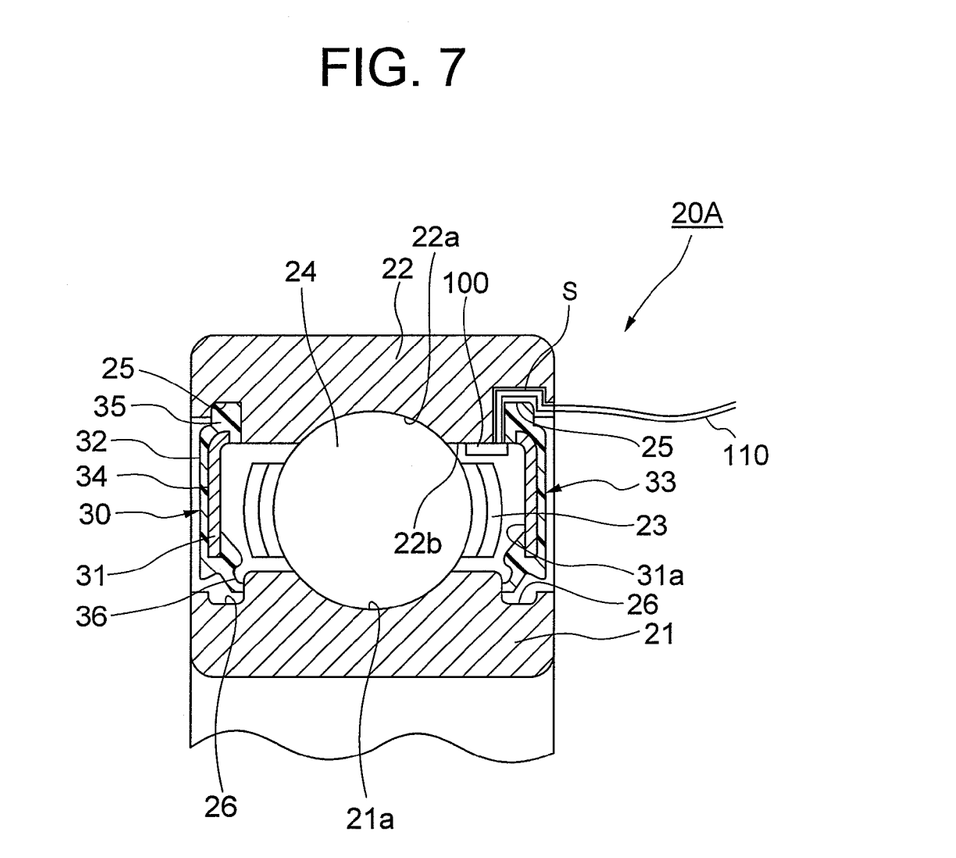
FIG. 7 A principal sectional view showing a principal portion of the bearing with the temperature sensor configured in the way of changing a disposing position of the temperature sensor in FIG. 4.
Figure 8:
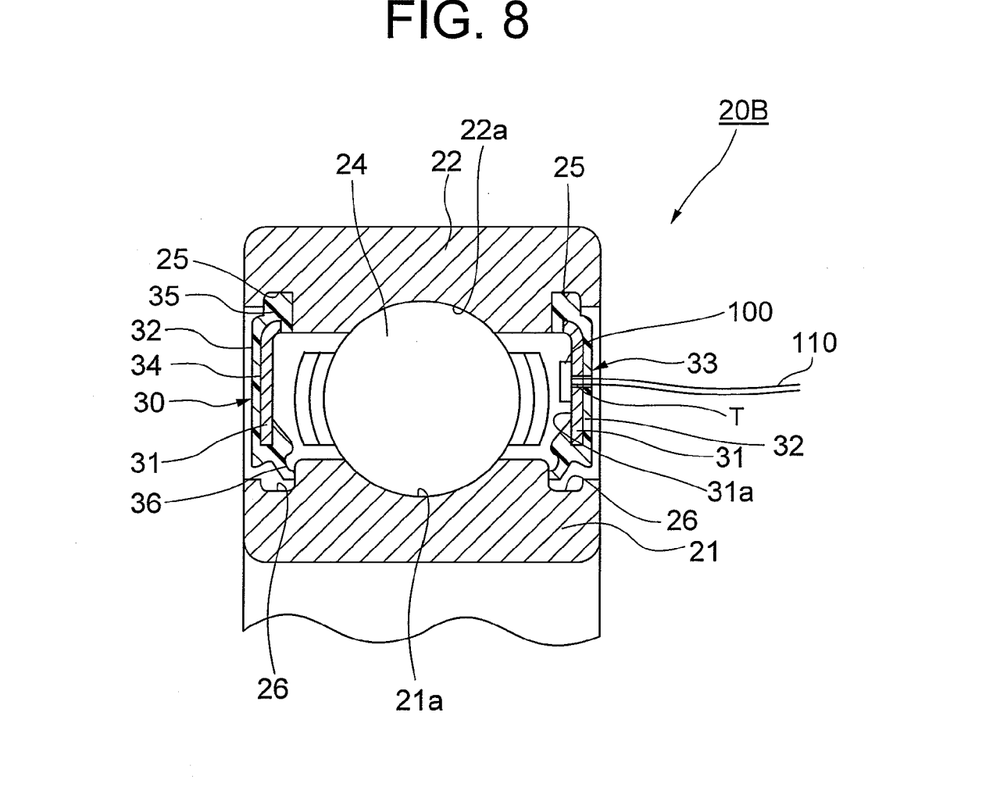
FIG. 8 A principal sectional view showing the principal portion of the bearing with the temperature sensor configured in the way of further changing the disposing position of the temperature sensor in FIG. 4.

Next, two modifications of the bearing with the temperature sensor configured in a way that changes the disposing position of the temperature sensor in FIG. 4, will hereinafter be described with reference to FIGS. 7 and 8. FIG. 7 is a principal sectional view showing a principal portion of the bearing with the temperature sensor configured in the way of changing the disposing position of the temperature sensor in FIG. 4. FIG. 8 is a principal sectional view showing the principal portion of the bearing with the temperature sensor configured in the way of further changing the disposing position of the temperature sensor in FIG. 4.

The bearings 20a, 20B each including the temperature sensor illustrated in FIGS. 7 and 8 take the same configuration as that of the bearing 20 with the temperature sensor in FIG. 1, so that the same components are marked with the same numerals and symbols, and their explanations are omitted.

As shown in FIG. 7, the bearing 20A with the temperature sensor is configured such that the temperature sensor 100 is fitted to a portion, vicinal to the rolling surface 22a, of the inner peripheral surface 22b of the outer ring 22 on the fixing side. A through-hole S penetrating the inner peripheral surface 22b of the outer ring 22 and the side face of the outer ring 22 throughout is provided as a wiring draw-out portion.

The temperature sensor 100 is fitted in the vicinity of the rolling surface 22a of the outer ring 22, and a pair of electric wires 110 extending from the temperature sensor 100 are drawn out to the outside from the side face of the outer ring 22 via the through-hole S.

The bearing 20A with the temperature sensor in FIG. 7 exhibits the same operational effect as that of the bearing 20 with the temperature sensor in FIG. 4, gains a high response of the temperature detection, and enables the detectability of the abnormality in temperature to be improved and the durable bearing with the temperature sensor to be actualized.

The bearing 20B with the temperature sensor shown in FIG. 8 is configured such that the temperature sensor 100 is fitted to the inner surface 31a of the cored bar 31 of the seal 33. The seal 33 is provided with, as the wiring draw-out portion, the through-hole T penetrating the cored bar 31 and the elastic member 32 throughout.

The temperature sensor 100 is fitted to inner surface 31a of the cored bar 31 of the seal 33, and the pair of electric wires 110 extending from the temperature sensor 100 are drawn out to the main portion 34 of the seal 33 via the through-hole S of the seal 33.

The bearing 20 with the temperature sensor in FIG. 8 exhibits the same operational effect as that of the bearing 20 with the temperature sensor in FIG. 4, gains the high response of the temperature detection, and enables the detectability of the abnormality in temperature to be improved and the durable bearing with the temperature sensor to be actualized.

Figure 9:
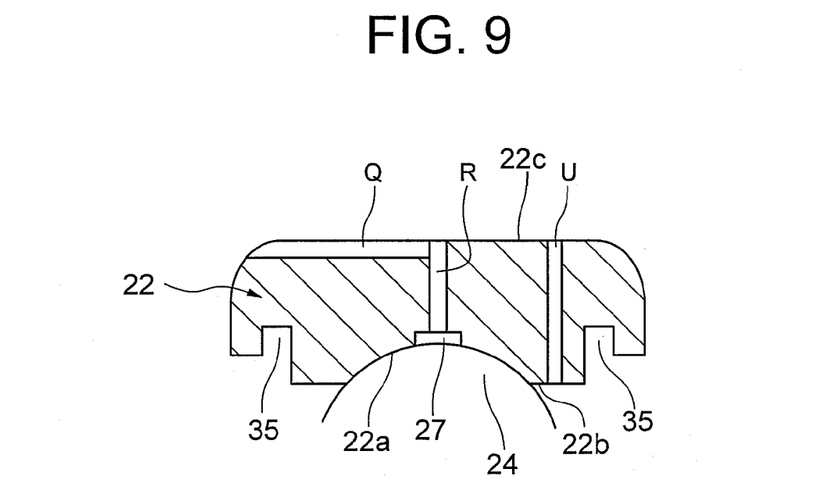
FIG. 9 A principal sectional view for explaining a modified example of changing positions of wiring draw-out portions in FIGS. 4 and 7.

Next, a modification of changing the positions of the wiring draw-out portions in FIGS. 4 and 7 will hereinafter be described with reference to FIG. 9. FIG. 9 is a principal sectional view for explaining the modified example of changing the positions of the wiring draw-out portions in FIGS. 4 and 7.

A through-hole R serving as the wiring draw-out portion illustrated in FIG. 9 extends upwards in FIG. 9 from the recessed portion 27 formed in the rolling surface 22a of the outer ring 22 in FIG. 4, and penetrates the outer peripheral surface 22c of the outer ring 22. In the case of fitting the temperature sensor 100 in the recessed portion 27 as in FIG. 4, the pair of electric wires 110 can be drawn out to the outer peripheral surface 22c of the outer ring 22 via the through-hole R.

Further, as in FIG. 9, a groove Q serving as the wiring draw-out portion may be formed in the outer peripheral surface 22c of the outer ring 22 in a way that extends to the side face of the outer ring 22 so as to connect with the through-hole R. The pair of electric wires 110 drawn out of the through-hole R can be led to the side face of the outer ring 22 via the groove Q.

Moreover, a through-hole U serving as the wiring draw-out portion in FIG. 9 extends upwards in FIG. 9 from the inner peripheral surface 22b in the vicinity of the rolling surface 22a of the outer ring 22 in FIG. 4, and penetrates the outer peripheral surface 22c of the outer ring 22. In the case of fitting the temperature sensor 100 to the inner peripheral surface 22b in the vicinity of the rolling surface 22a of the outer ring 22 as in FIG. 7, the pair of electric wires 110 can be drawn out to the outer peripheral surface 22c of the outer ring 22 via the through-hole U.

As described above, according to the bearings 20, 20A and 20B each having the temperature sensor in FIGS. 4 through 8, the temperature sensor 100, which is thin and small-sized and has the flexibility, can be incorporated into whichever portion of the bearing and fitted in the desired position within the bearing because of there being no limitation to the fitting position of the temperature sensor 100. Hence, the response to the temperature detection is speeded up, and the predictability enabling the prediction of the occurrence of the inconvenience to be made beforehand, which is caused by the abnormality in temperature with respect to the bearing.

Further, the temperature sensor, which is less of the deterioration without being cracked and is excellent of the durability, elongates a life of the temperature sensor itself, and is easy to be mass-producible owing to batchwise formation that involves utilizing the semiconductor manufacturing process as well as enabling the bearing with the temperature sensor to be provided at the low cost because of being capable of reducing the manufacturing cost by downsizing the bearing and giving the excellent mass-productivity.

Second Example

Next, the present invention will hereinafter be described by way of a second example more specifically but is not limited to this example.

The same temperature sensor as the temperature sensor illustrated in FIGS. 5A, 5B and 6 was manufactured by the same process as the following semiconductor manufacturing process. The discussion will be made with reference to FIGS. 10(a) through 10(i). FIGS. 10(a) through 10(i) are schematic diagrams for explaining processes (a) to (i) for manufacturing the temperature sensor in FIGS. 5A, 5B and 6 in the second example.

Figure 10A:
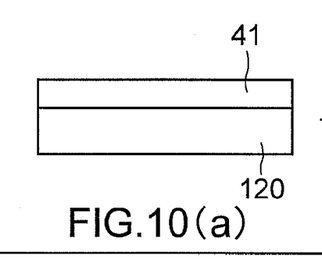
FIG. 10 A schematic diagram for explaining processes (a)-(i) for manufacturing the temperature sensor in FIGS. 5A, 5B and 6 in a second example.

As shown in FIG. 10(a), a photo resist (OFPR800LB® made by Tokyo Ohka Kogyo Co., Ltd.) 41, which is approximately 2 μm in thickness, is coated by spin coating over the surface of the film substrate 120 composed of a film PI (which is Kapton® made by Du Pont-Toray Co., Ltd.) and undergoes a pre-baking process at 90° C. for 2 min (a).

Figure 10B:
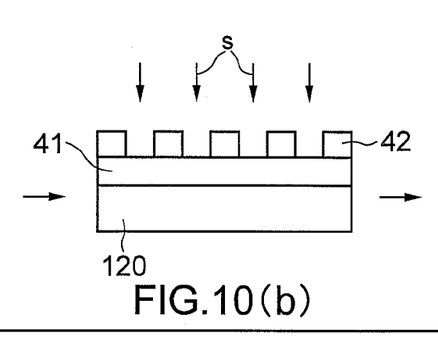

As illustrated in FIG. 10(b), thereafter, an exposure (by use of a mask aligner EMA-400® made by Union Optical Co., Ltd.) is performed in a direction s by employing a mask 42 subjected to patterning by the temperature sensor portion 130 as in FIG. 5A (b).

Figure 10C:
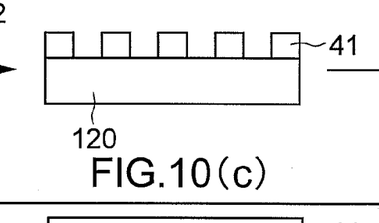

Next, as shown in FIG. 10(c), development is carried out by employing a developing solution (MMD3® made by Tokyo Ohka Kogyo Co. Ltd.), and rinsing is conducted finally in super-pure water for 60 sec. A pattern corresponding to the pattern of the mask 42 is thereby formed on the photo resist 41 (c).

Figures 10D, 10E:
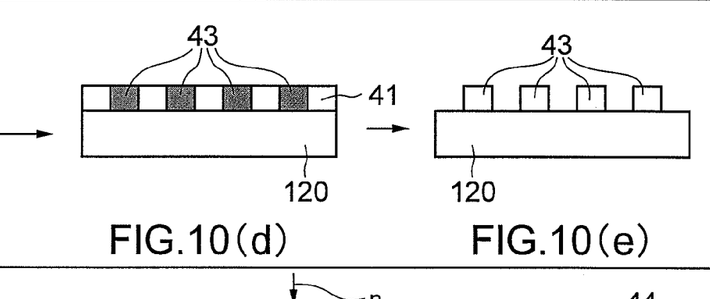

As in FIG. 10(d), thereafter, a platinum film 43, which is approximately 250 nm in thickness, is formed by the sputtering method (d), and then, as in FIG. 10(e), the photo resist residual on the film substrate 120 is removed by use of a lift-off method employing acetone (e). The platinum 43 in FIG. 10(e) builds up the temperature sensor portion 130 in FIG. 5A.

Figure 10F:
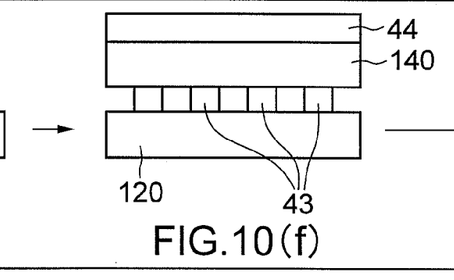

Next, as in FIG. 10(f), the same type of PI film 140 is bonded to and covered over the film substrate 120 by use of a bonding agent film (Pyralux® made by Du Pont Co., Ltd.), and a photo resist 44 is spin-coated over the film cover 140 and pre-baked (f).

Figure 10G:
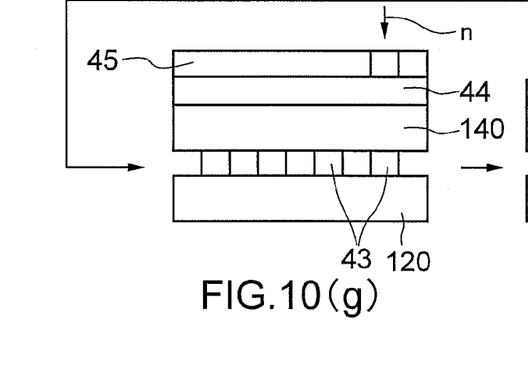
Figure 10H:
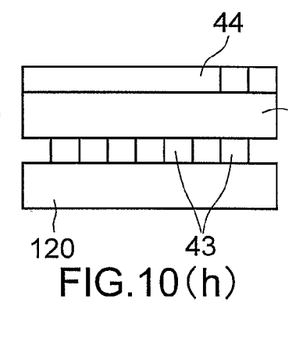
Figure 10I:
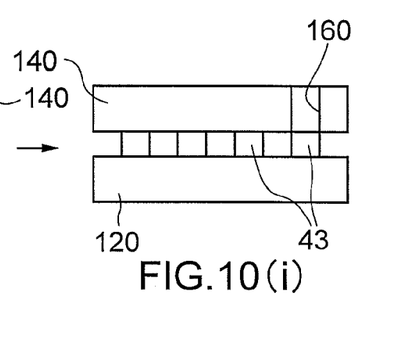

Next, as in FIG. 10(g), the exposure is performed in a direction n by employing a mask 45 subjected to patterning which corresponds to a hole 160 in FIG. 6 (g). Subsequently, developing and rinsing are conducted, thereby forming a pattern corresponding to the pattern of the mask 45 on the photo resist 44 (h).

Next, as in FIG. 10(*i*), the PI film 140 is etched by use of an etching agent (TPE3000® made by Toray Engineering Co., Ltd.), and thereafter the residual photo resist is removed by acetone (i). The hole 160 in FIG. 6 is thereby formed in the film cover 140, and, as in FIG. 5B, a wire fitting portion 150 of the temperature sensor portion 130 is exposed to the film cover 140.

Thereafter, as in FIG. 6, the electric wire 110 is fitted to the wire fitting portion 150, and then the whole temperature sensor is cut into individual temperature sensors.

Figure 11:
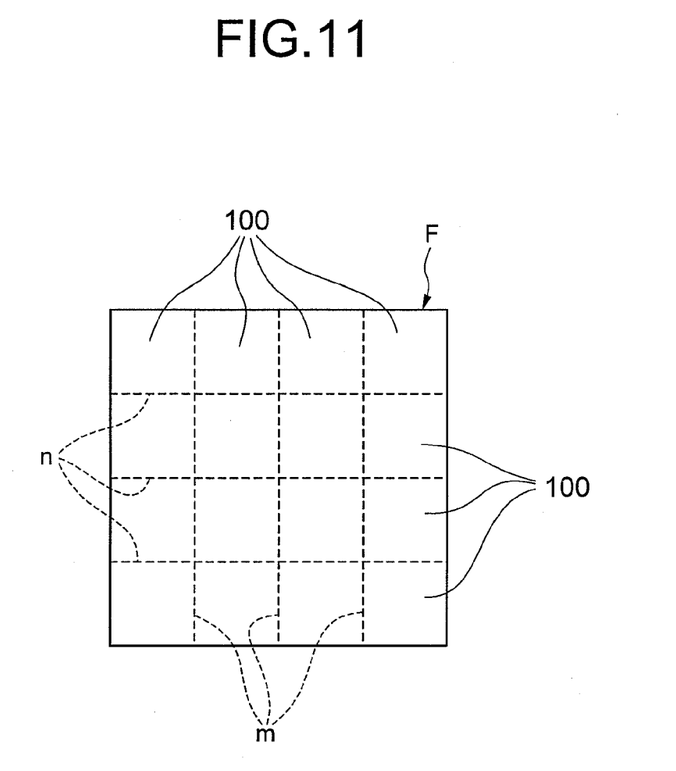
FIG. 11 An explanatory plan view of a comparatively wide film, showing a configuration for mass-producing the temperature sensors in the second example 2.

For example, as in FIG. 11, the multiplicity of temperature sensors 100 is formed through the semiconductor manufacturing process as in FIGS. 10(*a*) to 10(*i*) on the comparatively wide PI film and then cut along vertical and horizontal cutting lines m, n, thereby enabling the multiplicity of temperature sensors 100 to be easily mass-produced and the manufacturing cost to be reduced.

The thus-manufactured temperature sensor 100 has the following dimensions, in which the entire width a of the temperature sensor portion 130 in FIG. 5A is on the order of 200 μm, the width b of the band portion is 30 μm, the width X of the temperature sensor 100 is 250 μm, the length Y thereof is 250 μm, and the thickness X in FIG. 6 is 75 μm, however, these dimensions are given by way of one example and can be changed according to the necessity.

The thus-manufactured temperature sensor 100 is bonded to the same position A (the recessed portion 27) as that of the bearing 20 in FIG. 4 by way of the second example. By way of the second example, similarly, the temperature sensor 100 is, as depicted by the broken line in FIG. 4, bonded to a position A' of the outer peripheral surface 22c of the outer ring 22 of the bearing 20, and temperatures at the positions A, A' are measured, respectively.

The following are the measuring conditions.

Bearing: single row deep groove ball bearing 6203 (bearing number) made by NSK Ltd.

Number of revolutions: 10,000 rpm

Rotating time: one hour

Figure 12:
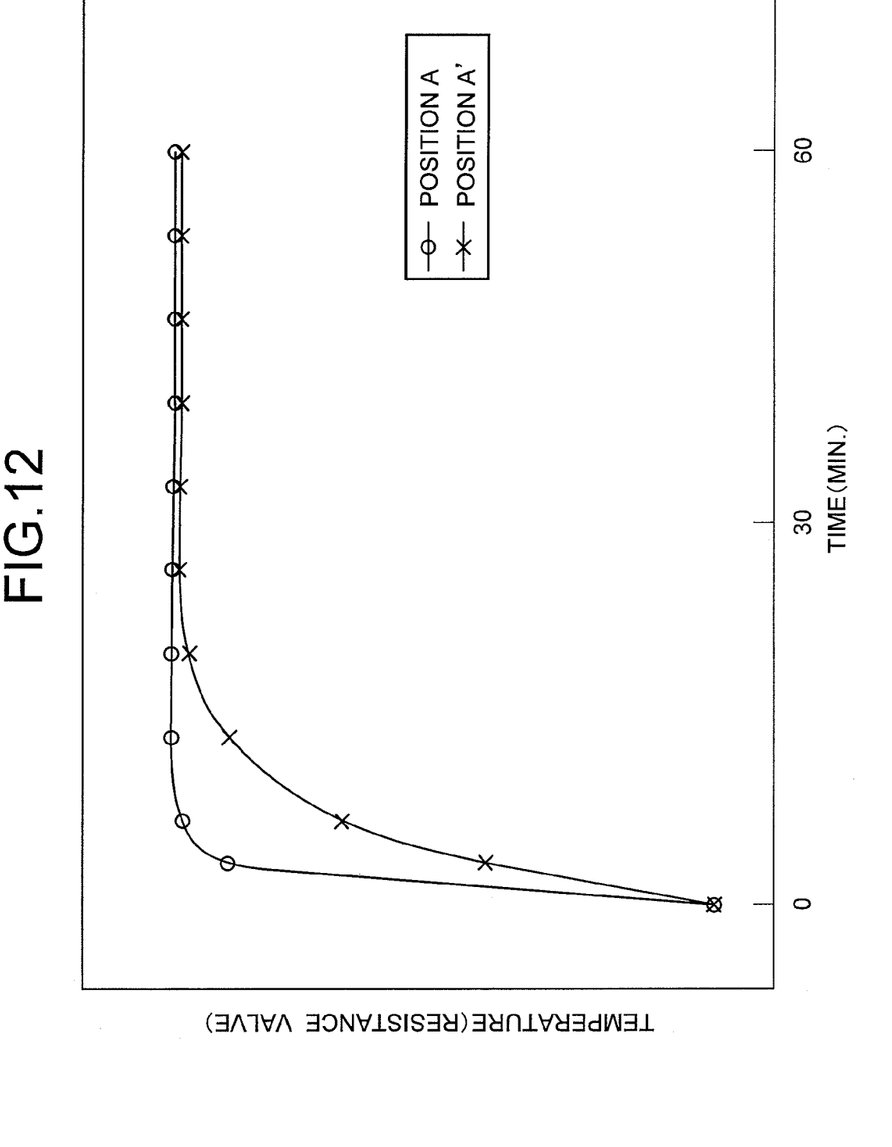
FIG. 12 A graph showing a change in temperature (resistance value) according to time, which is measured in the second example 2.

FIG. 12 shows changes in the measured temperature (resistance value) according to the time. As understood from FIG. 12, the temperature sensor in the position A according to the second example, which is incorporated into the rolling surface 22a of the outer ring 22 of the bearing in FIG. 4, can quickly acquire the much faster response and more accurate temperature than in the case of the measurement in the position A' on the outer surface of the bearing according to the second comparative example.

The best mode for carrying out the present invention has been discussed so far, however, the present invention should not be construed in the way of being limited to the embodiments described above, and can be, as a matter of course, properly changed and modified. For example, in FIGS. 1, 4, 7 and 8, the inner ring of the rolling bearing is set on the rotating side, however, the outer ring may also be set on the rotating side, and in this case the same operational effect can be acquired by similarly fitting the temperature sensor to the inner ring on the fixing side and providing the wiring draw-out portion.

Further, each of the bearings in FIGS. 1, 4, 7 and 8 is the single row deep groove ball bearing, however, the present invention is not limited to this type of bearing but may take other types of rolling bearings and can be, as a matter of course, applied to the general types of bearings. Moreover, each of the temperature sensors may also be constructed of a thermocouple type composed of heterogeneous metal thin film.

INDUSTRIAL APPLICABILITY

As described above, the bearing apparatus according to the present invention is capable of measuring the temperature in the desired position of the bearing by the temperature sensor as well as being excellent in terms of the wiring extension flexibility, then has not the limitation in the fitting position of the temperature sensor but the durability and is useful for enabling the detectability of the abnormality in temperature.

What is claimed is:

1. A bearing apparatus comprising:
   a bearing; and
   a temperature sensor,
   said temperature sensor including:
      a film-like substrate composed of a heat-resistant resin;
      a film-like temperature sensor portion formed on said substrate;
      a film-like cover provided so as to cover said temperature sensor portion and composed of the heat-resistant resin; and
      a wire fitting portion configured so that a part of said temperature sensor portion is exposed to the surface of said cover,
   wherein said temperature sensor is fitted so as to contact with a bearing portion.

2. A bearing apparatus according to claim 1, wherein said substrate and said cover are each composed of a polyimide resin.

3. A bearing apparatus comprising:
   a rolling bearing including an outer ring, an inner ring, and rolling elements disposed between said outer and inner rings; and
   a temperature sensor,
   said temperature sensor including:
      a film-like substrate composed of a heat-resistant resin;
      a film-like temperature sensor portion formed on said substrate;
      a film-like cover provided so as to cover said temperature sensor portion and composed of the heat-resistant resin; and
      a wire fitting portion configured so that a part of said temperature sensor portion is exposed to the surface of said cover,
   wherein said temperature sensor is fitted so as to contact with a bearing portion.

4. A bearing apparatus according to claim 3, wherein said temperature sensor is fitted to a recessed portion formed in one of said outer and inner rings on a fixing side.

5. A bearing apparatus according to claim 3, wherein said temperature sensor is fitted in the vicinity of one of said outer and inner rings on a fixing side.

6. A bearing apparatus according to claim 3, wherein said rolling bearing includes a seal attached to one of said outer and inner rings on a fixing side, and said temperature sensor is fitted to said seal.

7. A bearing apparatus according to claim 6, wherein said seal includes a cored bar and an elastic portion, and said temperature sensor is fitted to said cored bar or said elastic portion.

8. A bearing apparatus according to claim 3, wherein a wiring draw-out portion for drawing out to the outside an electric wire electrically connected to said wire fitting portion is provided on one of said outer and inner rings on a fixing side.

9. A bearing apparatus according to claim 3, wherein said substrate and said cover are each composed of a polyimide resin.

* * * * *